(12) United States Patent
Takano

(10) Patent No.: US 6,896,183 B2
(45) Date of Patent: May 24, 2005

(54) MULTI-APPLICATION IC CARD

(75) Inventor: Tomoharu Takano, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 10/381,902

(22) PCT Filed: Jul. 30, 2002

(86) PCT No.: PCT/JP02/07732

§ 371 (c)(1),
(2), (4) Date: Mar. 27, 2003

(87) PCT Pub. No.: WO03/015021

PCT Pub. Date: Feb. 20, 2003

(65) Prior Publication Data

US 2003/0189092 A1 Oct. 9, 2003

(30) Foreign Application Priority Data

Aug. 3, 2001 (JP) .......................................... 2001-236776
Aug. 3, 2001 (JP) .......................................... 2001-236777

(51) Int. Cl.[7] ................................................ G06K 5/00
(52) U.S. Cl. ........................ 235/380; 235/492; 235/375; 235/382
(58) Field of Search ................................ 235/380, 492, 235/379, 486, 382; 711/115

(56) References Cited

U.S. PATENT DOCUMENTS 5,923,884 A * 7/1999 Peyret et al. ................. 717/167
6,220,510 B1 * 4/2001 Everett et al. ............... 235/380
6,256,690 B1 * 7/2001 Carper ......................... 710/301
6,279,047 B1 * 8/2001 Bublitz et al. ................ 710/11
6,612,486 B2 * 9/2003 Sato et al. .................... 235/375
6,619,554 B1 * 9/2003 Vestergaard et al. ......... 235/492
6,707,892 B2 * 3/2004 Kawagishi ................ 379/93.05
6,824,064 B2 * 11/2004 Guthery et al. .............. 235/492
6,832,323 B1 * 12/2004 Booth et al. ................. 713/201
2004/0210680 A1 * 10/2004 Yamamura et al. ............ 710/8

FOREIGN PATENT DOCUMENTS

| JP | 6-161855 A | 6/1994 |
| JP | 8-137759 A | 5/1996 |
| JP | 2000-172808 A | 6/2000 |
| JP | 2001-195266 A | 7/2001 |

* cited by examiner

Primary Examiner—Michael G. Lee
Assistant Examiner—Ahshik Kim
(74) Attorney, Agent, or Firm—Dellett & Walters

(57) ABSTRACT

In a multi-application IC card system which is loaded with a plurality of applications and is provided with a platform allowing deletion of the applications, the platform (1) contains an AID control table for controlling the correspondence between each application and its application identifier (AID), and the change of each AID is conducted by rewriting the corresponding AID in the AID control table. Alternatively, the platform (1) has a function of applying an alias AID in addition to the application identifier (AID) assigned to each application and controls the correspondence among each application, its AID, and its alias AID by using an AID control table.

2 Claims, 4 Drawing Sheets

FIG. 2(a)

| Application Name | AID |
|---|---|
| Application A | 0 0 0 1 |
| Application B | 0 0 0 2 |

FIG. 2(b)

| Application Name | AID |
|---|---|
| Application A | 0 0 0 2 |
| Application B | 0 0 0 1 |

FIG. 4(a)

| Application Name | AID | Alias AID |
|---|---|---|
| Application A | 0 0 0 2 | |
| Application B | 0 0 0 1 | |

FIG. 4(b)

| Application Name | AID | Alias AID |
|---|---|---|
| Application A | 0 0 0 2 | 0 0 0 1 |
| | | |

MULTI-APPLICATION IC CARD

TECHNICAL FIELD

The present invention relates to a multi-application IC card system which is loaded with a plurality of independent applications and is provided with a platform allowing the deletion of the applications. The IC card system can flexibly cope with service integration among different application providers, version upgrade of existing applications, and the maintenance of such applications.

BACKGROUND ART

With the recent increase of IC card use, many systems for achieving a single IC card which is loaded with a plurality of applications have been proposed. In addition, for version upgrade and maintenance of applications and service integration among application providers, it has been required to allow the deletion and updating of the applications. Systems for achieving the deletion and updating also have been proposed (Japanese Patent Unexamined Publication No. 2000-172808).

Currently in an IC card system, each application program stored in the IC card is designated by a unique application ID (AID), which is assigned according to that program's position or order in the IC card memory. A table in the IC card memory notes, for each AID, where the corresponding program begins (also in the IC card memory). Unfortunately, the use of this system results in some inefficiency when changing an application program. For example, if there are two application programs stored in the IC card, and it is desired to replace the first program with an updated version that is slightly longer, this cannot be done by simply overwriting the first program because it would mean overwriting part of the second program with the end part of the first program. Even if there is easily sufficient room to write the updated first program in IC card memory after the location where the second application program ends, this cannot be done because then the first application would have to be re-designated as the third program. This would require a corresponding change in the programming of each external device that communicates with the IC card and uses the first application. It would be desirable to have some way of changing the position or order in memory where the program for a particular application is stored, without thereby necessitating a change in the AID used by external programs to refer to that application.

Stated slightly differently, in an IC card, applications are assigned unique application IDs (AIDs), respectively, whereby each application is identified by the corresponding AID. However, the AIDs are not changeable in current IC cards. In case that an outside system is programmed to run with a certain AID, it a new application is installed into the IC card to be used in the existing outside system, AIDS assigned in the Outside system must be changed. On the other hand, for changing the AIDs assigned in the IC card without making a change to the AIDS in the outside system, the existing application must be all deleted before assigning new AIDS. However, it takes significant man-hours and a long time to change AIDS after deleting the existing applications because of slow executing speed of the IC card.

The present invention has been made for solving the aforementioned problem. Therefore, the object of the present invention is to apply a function of changing the ID of each application and a function of applying an alias ID to the application, thereby achieving application management capable of flexibly coping with the version upgrade and maintenance of each application, and the service integration among application providers.

DISCLOSURE OF THE INVENTION

The present invention relates to an IC card system which can be loaded with a plurality of applications and is provided with an IC card platform allowing deletion of the applications. An application identifier (AID) control table is used to control AIDs to prevent collision between AIDs in the platform. When a new application is installed in the IC card and is required to be assigned an existing AID which has been used for any one of the existing applications, the existing AID is changed to be assigned to the new application and the existing application is changed to have another AID by means of an AID changing function, for example changing means such as a changing command and an application program, thereby achieving consistency of the respective AIDs in the IC card.

The present invention relates to an IC card system which can be loaded with a plurality of applications and is provided with an IC card platform allowing deletion of the applications. An application identifier (AID) control table is used to control AIDs to prevent collision between AIDs in the platform. When one or more of the applications is deleted for the integration of applications or other reasons and the AID of the application is required to be used even after the deletion of the application, the AID which has been used for the deleted application is assigned as an alias AID to the integrated application by means of an AID applying function, for example AID applying means such as an AID applying command and an application program, thereby achieving consistency of AIDs including the assigned alias AID in the IC card.

In the system as described in the above, further flexible application management is achieved. Therefore, the system can flexibly cope with service integration among different application providers, version upgrade of each application, and the maintenance of the application.

BRIEF DESCRIPTION OF THE DRAWINGS

FIGS. 2(a), 2(b) are schemata for explaining application identifier control tables;

FIGS. 4(a), 4(b) are schemata for explaining application identifier control tables.

BEST MODE FOR CARRYING OUT THE INVENTION

Hereinafter, embodiments of the present invention will be described with reference to attached drawings.

Figure 1A:
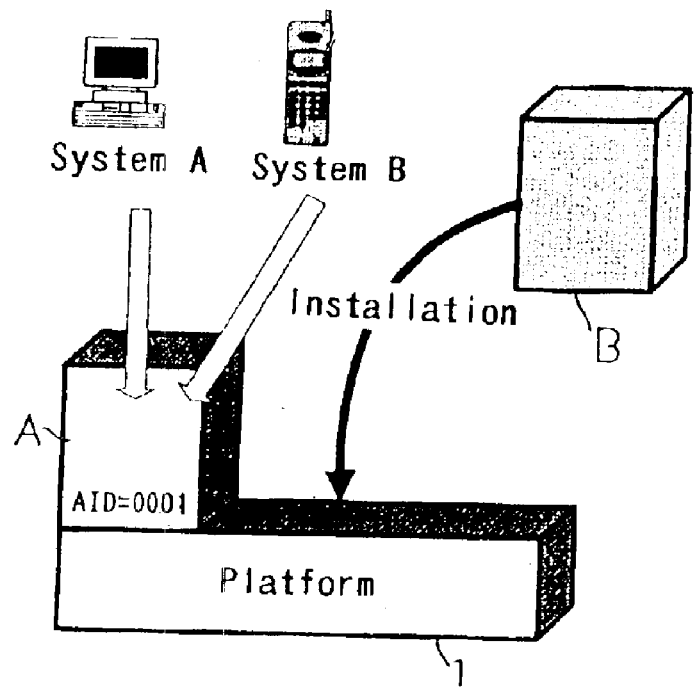
FIGS. 1(a), 1(b) are schematic illustrations for explaining an embodiment of the IC card system of the present invention.
Figure 1B:
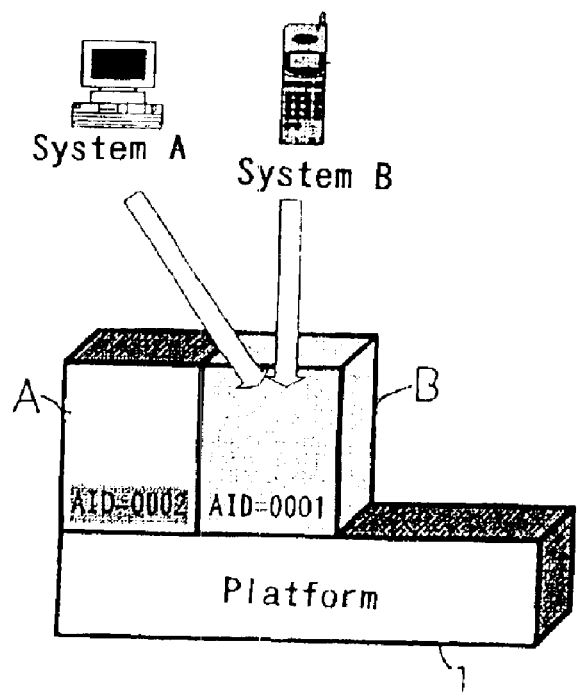

FIGS. 1(a), 1(b) are schematic illustrations for explaining an embodiment of an IC card system of the present invention and FIGS. 2(a), 2(b) are schemata for explaining application identifier control tables.

In FIG. 1(a), an application A is loaded on a platform 1 in an IC card. The platform 1 includes an interpreter which interprets commands of applications one by one within the IC card. The application identifier (AID) of the application is "0001". It is assumed that this application A is used by an outside system A and an outside system B.

Assuming that a new application B is installed into the IC card to be used by the outside system A and the outside system B, the following description will be made. Since "AID=0001" is used in the outside systems, the AID of the application B must be assigned "0001" for allowing the use of the application B by the outside systems without making a change to the outside systems. In the present invention, an AID control table indicating the correspondences between the application names and AIDs as shown in FIG. 2(a) is prepared in the platform 1. By using the AID control table, a control is conducted to prevent the collision between AIDs. According to the AID control table, as shown in FIG. 2(b), the AID of the application A is changed to "0002" and the AID of the application B is changed to "0001".

By the changing process of AIDs, as shown in FIG. 1(b), the outside system A and the outside system B can use the new application B without making a change to the systems A and B, i.e. with the same "AID=0001". The changing process of AIDs is achieved in the following manner. For example, in case of employing Card Manager (card management application) in VISA Open Platform, the following command:

RENAME AppB (0001) AppA (0002)

is sent to change the application identifier by utilizing the AID changing function.

Alternatively, an application having a special authority implements the following protocol (function):

RENAME (AppB (0001), AppA (0002))

to change the application identifier by utilizing the AID changing function.

Figure 3A:
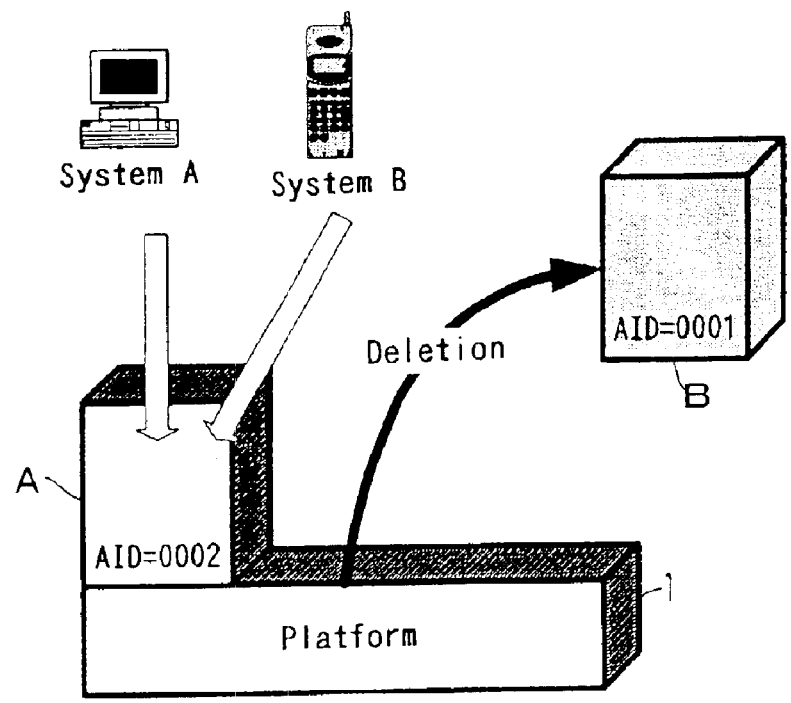
FIGS. 3(a), 3(b) are schematic illustrations for explaining another embodiment of the IC card system of the present invention.
Figure 3B:
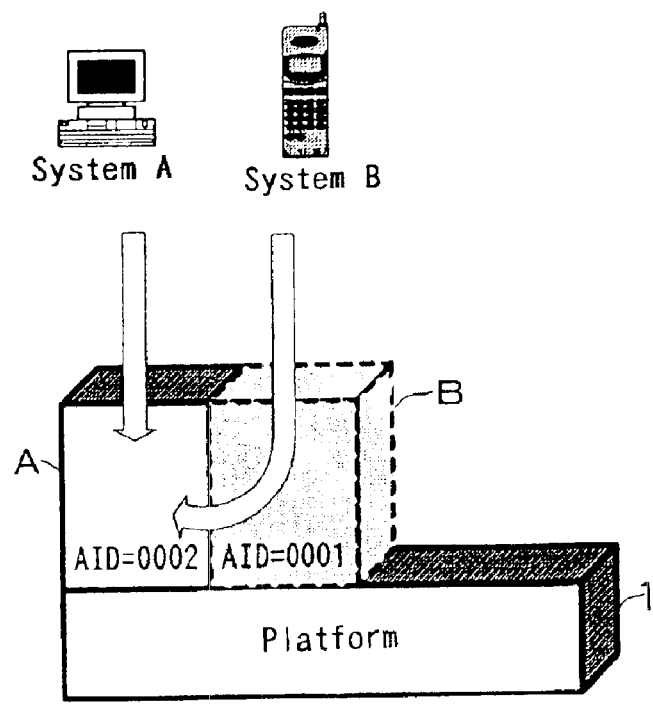

FIGS. 3(a), 3(b) are schematic illustrations for explaining another embodiment of an IC card system of the present invention and FIGS. 4(a), 4(b) are schemata for explaining application identifier control tables.

In FIG. 3(a), an application A (application identifier (AID)=0002) and an application B (AID=0001) are loaded on a platform 1 in an IC card. The platform 1 includes an interpreter which interprets commands of applications one by one within the IC card. The application A is used by an outside system A and the application B is used by an outside system B. It is assumed that, under the condition described above, the application B is integrated to the application A so as to delete the application B.

Assuming that after the application B is deleted, the application A is used by both the outside system A and the outside system B, the following description will be made. Since "AID=0001" is used in the outside system B, the outside system B can not use the application A if nothing of the outside systems is changed. Accordingly, the application A is further assigned an alias "AID=0001". At this point, an AID control table indicating the correspondences among the application names, AIDs, and alias AIDs as shown in FIG. 4(a) is prepared in the platform 1. By using the AID control table, a control is conducted to prevent the collision between AIDs. According to the AID control table, as shown in FIG. 4(b), the application A is assigned the alias "AID=0001" in addition to "AID=0002". As shown in FIG. 3(b), whenever the outside system B accesses the alias "AID=0001", the access is always sent to the application A having "AID=0002".

By the process applying the alias AID, the outside system A and the outside system B can access the integrated application without making a change to the systems A and B. The process applying alias AID is achieved in the following manner. For example, in case of employing Card Manager (card management application) in VISA Open Platform, the following command:

ALIAS AppB→AppA is sent to register the application B as an alias of the application by utilizing the alias function (alias applying function). Accordingly, as any command to the application B is inputted, the command is received by the application A and is executed by the application A.

Alternatively, an application having a special authority implements the following protocol (function):

alias (AppB, AppA)

to apply the alias AID by utilizing the alias function.

INDUSTRIAL APPLICABILITY

According to the present invention as described in the above, the utilization of new application, the service integration among different application providers, and the version upgrade of existing applications are allowed without making a change to systems on the application provider side (outside systems), thereby easily conducting the application management.

What is claimed is:

1. A multi-application IC card system which is loaded with a plurality of applications, each said application being identifiable by a signal received from an external device by way of an application identifier (AID), said IC card system further being provided with a platform allowing deletion of the applications, wherein said platform contains an AID control table having for each application a storage location for noting an associated AID wherein said AID associated to any application can be changed by rewriting said AID in said storage location for noting an associated AID.

2. A multi-application IC card system which is loaded with a plurality of applications, each said application being identifiable by a signal received from an external device by way of an application identifier (AID), said IC card system further being provided with a platform allowing deletion of the applications, wherein said platform contains an AID control table having for each application a storage location for noting an associated AID wherein said AID associated to any application can be changed by rewriting said AID in said storage location for noting an associated AID, wherein said AID control table further includes for each application an associated location for storing an AID alias, thereby permitting an external device that has been assigned to use a first application designated by a first AID to be reassigned to use a second application designated by a second AID by assigning said first AID as an alias AID of said of said second application.

* * * * *